US006233995B1

(12) United States Patent
Cleave et al.

(10) Patent No.: US 6,233,995 B1
(45) Date of Patent: May 22, 2001

(54) FORMING TOOL FOR A BENDING BRAKE

(75) Inventors: Jeffrey Van Cleave, Troy; Eugene G. Eichhorn, Pinckney, both of MI (US)

(73) Assignee: Van Mark Products Corporation, Farmington Hills, MI (US)

( * ) Notice: Subject to any disclaimer, the term of this patent is extended or adjusted under 35 U.S.C. 154(b) by 0 days.

(21) Appl. No.: 09/433,650

(22) Filed: Nov. 3, 1999

Related U.S. Application Data

(63) Continuation-in-part of application No. 09/203,593, filed on Dec. 2, 1998, now Pat. No. 6,000,268.

(51) Int. Cl.$^7$ .................................................. B21D 17/10
(52) U.S. Cl. ........................................................ 72/211
(58) Field of Search .............................. 72/210, 211, 321, 72/294, 319

(56) References Cited

U.S. PATENT DOCUMENTS

| | | |
|---|---|---|
| 4,660,399 | 4/1987 | Suter et al. . |
| 4,787,233 | 11/1988 | Beymer . |
| 4,989,429 | 2/1991 | Del Fabro et al. . |
| 5,425,259 | 6/1995 | Coben et al. . |
| 5,632,174 | 5/1997 | Hunter . |
| 5,706,693 | * 1/1998 | Chubb et al. ........................ 72/294 |
| 6,003,357 | * 12/1999 | Brown .................................. 72/321 |

FOREIGN PATENT DOCUMENTS 42 35 629 A1    4/1994  (DE) .

OTHER PUBLICATIONS

Knoll–Profilierkopf Knoll–Schneidkopf advertisment, Jan. 1993.
Brake Buddy Advertisement, Oct. 25, 1998.

* cited by examiner

Primary Examiner—Rodney A. Butler
(74) Attorney, Agent, or Firm—Brooks & Kushman P.C.

(57) ABSTRACT

A forming tool for creating a profile in a workpiece held within a bending brake is provided. The forming tool includes a body, and a carriage attached to the body and operable to move longitudinally along a guide provided on the bending brake. A pair of opposed forming dies is rotatably and removably mounted on the body, wherein the forming dies are operable to create a profile, such as for brick mold or a fascia rib, in the workpiece as the workpiece passes between the forming dies. The forming dies are interchangeable with another pair of forming dies for creating a different profile in the workpiece. The forming tool of the present invention is intended for use with any type of bending brake.

38 Claims, 4 Drawing Sheets

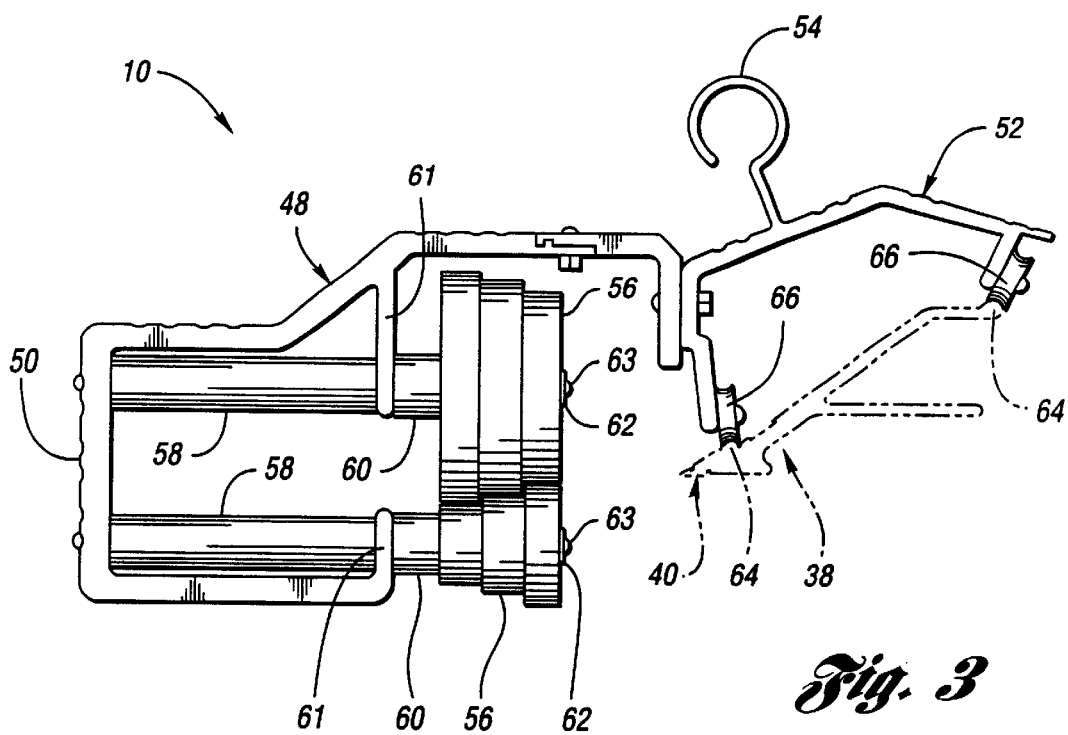
*Fig. 3*
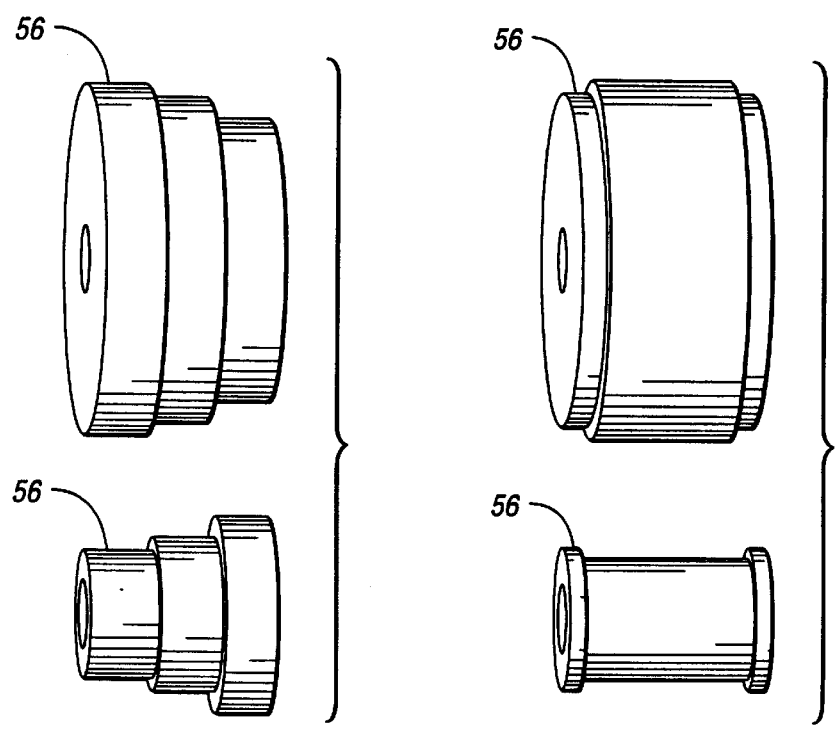
*Fig. 4a*          *Fig. 4b*

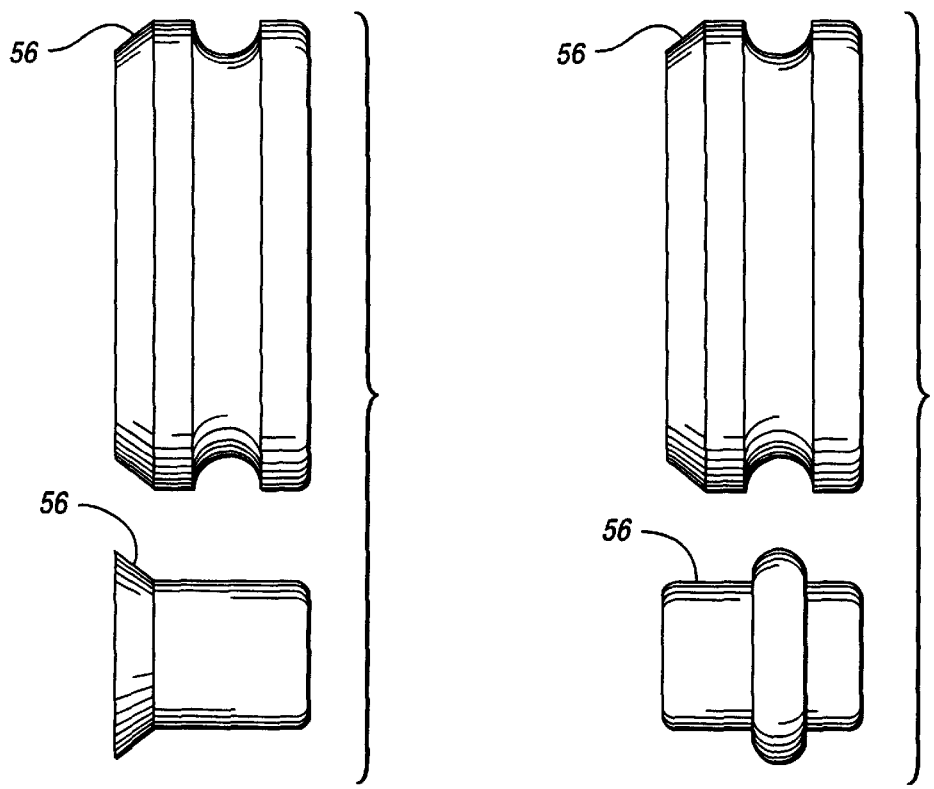
*Fig. 4c*
*Fig. 4d*
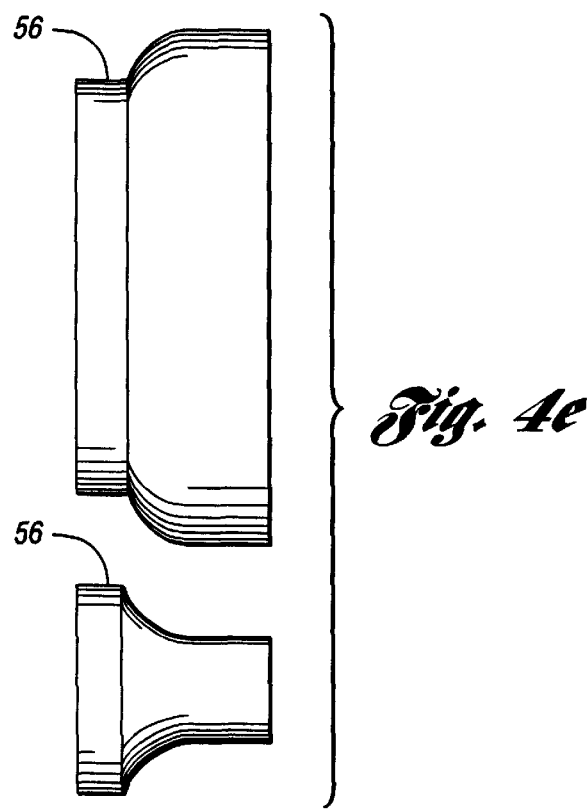
*Fig. 4e*

FORMING TOOL FOR A BENDING BRAKE

CROSS-REFERENCE TO RELATED APPLICATIONS

This application is a continuation-in-part of U.S. application Ser. No. 09/203,593 filed Dec. 2, 1998, now U.S. Pat. No. 6,000,268.

TECHNICAL FIELD

This invention relates to a forming tool for creating profiles in a workpiece held in a bending brake.

BACKGROUND ART

Portable bending brakes are constructed of an array of support castings that are held together by an appropriate frame. The castings are provided with a clamp and a bending structure that clamps and bends sheet material at the open ends of the castings. Such portable bending brakes are designed to be lightweight for use at job sites for bending relatively thin gauge sheet material, such as metal or plastic sheets, used to sheath portions of homes or other buildings. For example, portable bending brakes are used to bend aluminum and vinyl sheets into custom-formed siding and trim pieces to cover existing wood trim during new construction or remodeling.

Portable bending brakes, however, do have limitations that present problems for an operator attempting to make certain trim shapes. In particular, portable bending brakes are limited in how small, how close together, and how close to the edge of a workpiece that bends can be made. Consequently, various commonly needed trim shapes cannot be made easily on portable bending brakes, and must therefore be formed by difficult and time-consuming processes on the brake and may not always fit properly when installed on the house or building.

For example, one type of wood trim found on most houses is termed "brick mold" which consists of a double bend in the sheet material that is used to surround window and door frames. Portable bending brakes are not generally capable of making the small bends necessary to form brick mold, and consequently the operator is forced to make a loose fitting trim shape in a difficult and time-consuming manner that lacks the brick mold detail.

Another problem facing operators of portable bending brakes during installation of siding is how to keep long, flat sections of trim commonly used on fascia (the face of a roof overhang), from waving and rippling, or "oil canning" as it is termed in the art. One solution is to create a small rib along the center of the trim section to provide stiffening. Again, a portable bending brake is not capable of making such a small bend, and usually the rib must be fabricated in a factory.

DISCLOSURE OF INVENTION

Therefore, it is an object of the present invention to provide a forming tool that will quickly form commonly needed trim shapes not otherwise possible with a bending brake alone.

It is a further object of the present invention to provide a forming tool capable of creating profiles in a workpiece while the workpiece is clamped in the brake.

It is still a further object of the present invention to provide a forming tool for creating a profile in a workpiece held within a bending brake, wherein the forming tool can be readily added to an existing bending brake and is removably mounted on the brake.

It is another object of the present invention to provide a forming tool that is guided along the bending brake for creating straight, accurate, and consistent profiles.

It is another object of the present invention to provide a forming tool capable of creating a variety of different profiles in a workpiece through the use of interchangeable forming dies.

It is still another object of the present invention to provide a forming tool capable of creating profiles in wide workpieces that are either flat or pre-bent.

It is yet another object of the present invention to provide a forming tool that is not limited to creating profiles near the edge of the workpiece.

It is another object of the present invention to provide a forming tool that is light and portable for job site use.

Accordingly, a forming tool for creating a profile in a workpiece held within a bending brake is provided. The forming tool includes a body and a carriage attached to the body and operable to move longitudinally along a guide provided on the bending brake. A pair of opposed forming dies are rotatably and removably mounted on the body and are operable to create a profile, such as brick mold or a fascia rib, in the workpiece as the workpiece passes between the forming dies. The forming dies are interchangeable with another pair of forming dies for creating a different profile in the workpiece.

In a preferred embodiment of the present invention, the body includes a generally C-shaped throat sized to accommodate pre-bent and wide workpieces. In addition, the forming dies are preferably constructed from a plastic material and are removably mounted along shafts affixed to the body. A handle is preferably provided on one of the body and the carriage, and the forming tool is manually movable along the guide. Still further, the carriage preferably includes at least one pair of longitudinally spaced rollers operable to engage the guide, while still allowing the forming tool to be easily removable from the bending brake.

The forming tool of the present invention is intended for use with any type of bending brake or other material-working apparatus. As described herein, a preferred bending brake includes a base and at least two longitudinally spaced C-shaped support castings secured in assembly to the base. Each support casting includes a lower arm terminating in a horizontal support surface for supporting a workpiece and an upper arm spaced from and generally overlying the lower arm. The bending brake further includes a clamping arm for each casting. Each clamping arm has a first end pivotally secured to the support casting and a second end projecting toward the horizontal support surface. A clamping member is affixed to the second end of each clamping arm. The clamping member overlies the horizontal support surface and cooperates with the support surface for clamping a workpiece. A bending leaf is hinged to the horizontal support surface for bending the workpiece. A guide is provided that extends longitudinally along either the clamping member or the bending leaf. The forming tool engages the guide and moves longitudinally along the bending brake, allowing the forming dies to create a profile in the workpiece as the workpiece passes through the forming dies.

The above objects and other objects, features, and advantages of the present invention will be more readily understood after reviewing the attached drawings and specification.

BRIEF DESCRIPTION OF DRAWINGS

FIG. 3 is a side elevational view of the forming tool engaging a guide provided on the bending brake; and FIGS. 4a–4e are perspective views of different forming dies which can be utilized with the forming tool of the present invention.

BEST MODE FOR CARRYING OUT THE INVENTION

The present invention is directed to a forming tool that allows an operator to create profiles on a workpiece held within a bending brake. The forming tool is described in connection with the type of portable sheet bending brake disclosed in U.S. Pat. No. 4,566,304 issued to Van Cleave et al., the disclosure of which is incorporated herein by reference. However, it will be appreciated that the forming tool of the present invention may also be used with other types of bending brakes.

Figure 1:
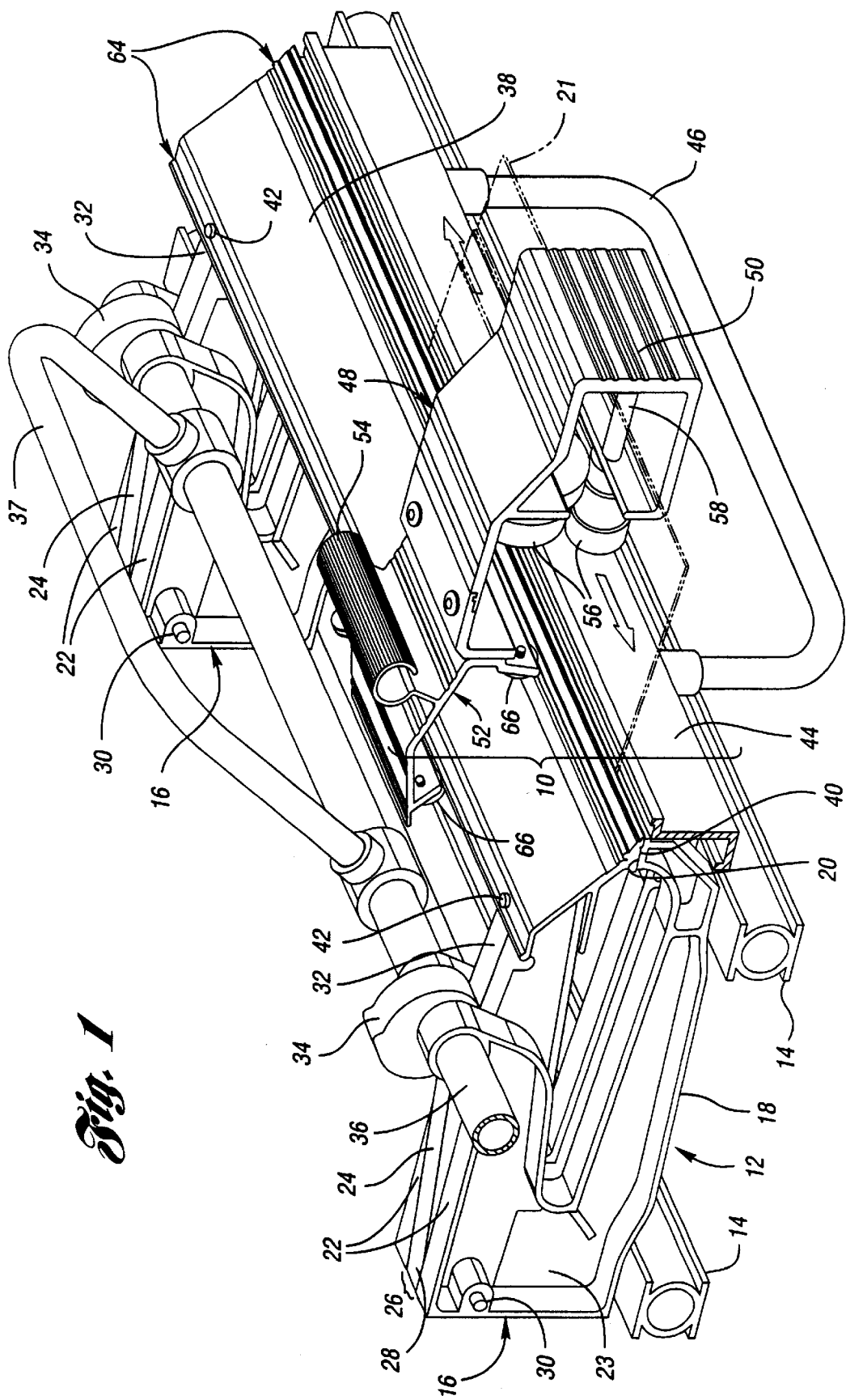
FIG. 1 is a perspective view of a bending brake on which is mounted a forming tool constructed in accordance with the present invention.

Referring to FIG. 1, a forming tool constructed in accordance with the present invention, designated by reference numeral 10, is illustrated in conjunction with a portable sheet bending brake 12. A relatively small bending brake 12 is illustrated. It is understood, however, that while commercial bending brakes are generally larger than the illustrated brake 12, their construction and principles of operation are similar to bending brake 12.

Bending brake 12 comprises a base 14 with at least two longitudinally spaced C-shaped support castings 16, preferably constructed from aluminum, that are secured to base 14. Each support casting 16 includes a lower arm 18 that terminates in a horizontal support surface 20 for supporting a workpiece 21, and further includes an upper arm 22 spaced from and generally overlying lower arm 18. A bight section 23 joins lower arm 18 and upper arm 22.

In the specific type of bending brake 12 depicted herein, upper arm 22 terminates short of support surface 20 and supports a cam locking mechanism operable upon a clamping arm 24 provided for each support casting 16. Clamping arm 24 is mounted in a vertical slot 26 defined by upper arm 22. Clamping arm 24 has a first end 28 pivotally secured, such as by a pivot pin 30, to support casting 16, preferably at bight section 23. A second end 32 of clamping arm 24 projects toward horizontal support surface 20. An eccentric cam 34 is disposed in each slot 26, and each cam 34 is mounted to be rotated with a shaft 36 extending through upper arms 22. Shaft 36 is provided with a handle 37 for manually rotating shaft 36 and cams 34.

A clamping member 38 is mounted at second ends 32 of clamping arms 24. Clamping member 38 has a clamping surface 40 which overlies horizontal support surface 20 and cooperates therewith for clamping a workpiece 21 therebetween. Suitable fasteners, such as vertical bolts 42, are used to secure clamping member 38 to clamping arms 34. Using handle 37, shaft 36 can be rotated, causing cams 34 to depress clamping arms 24. When lowered, clamping arms 24 move clamping member 38 into engagement with workpiece 21 positioned on support surface 20. Further details of the rotary cam locking system described above can be found in U.S. Pat. No. 4,566,304.

A bending leaf 44, provided with a depending handle 46, is hinged to horizontal support surface 20 for bending the workpiece 21. Bending leaf 44 and support surface 20 are typically interconnected by a hinge pin (not shown). Bending leaf 44 can be moved by swinging handle 46 upwardly toward clamping member 38 to bring bending leaf 44 into engagement with the workpiece. Legs (not shown) may be provided beneath base 14 as needed to support bending brake 12 above the floor.

Figure 2:
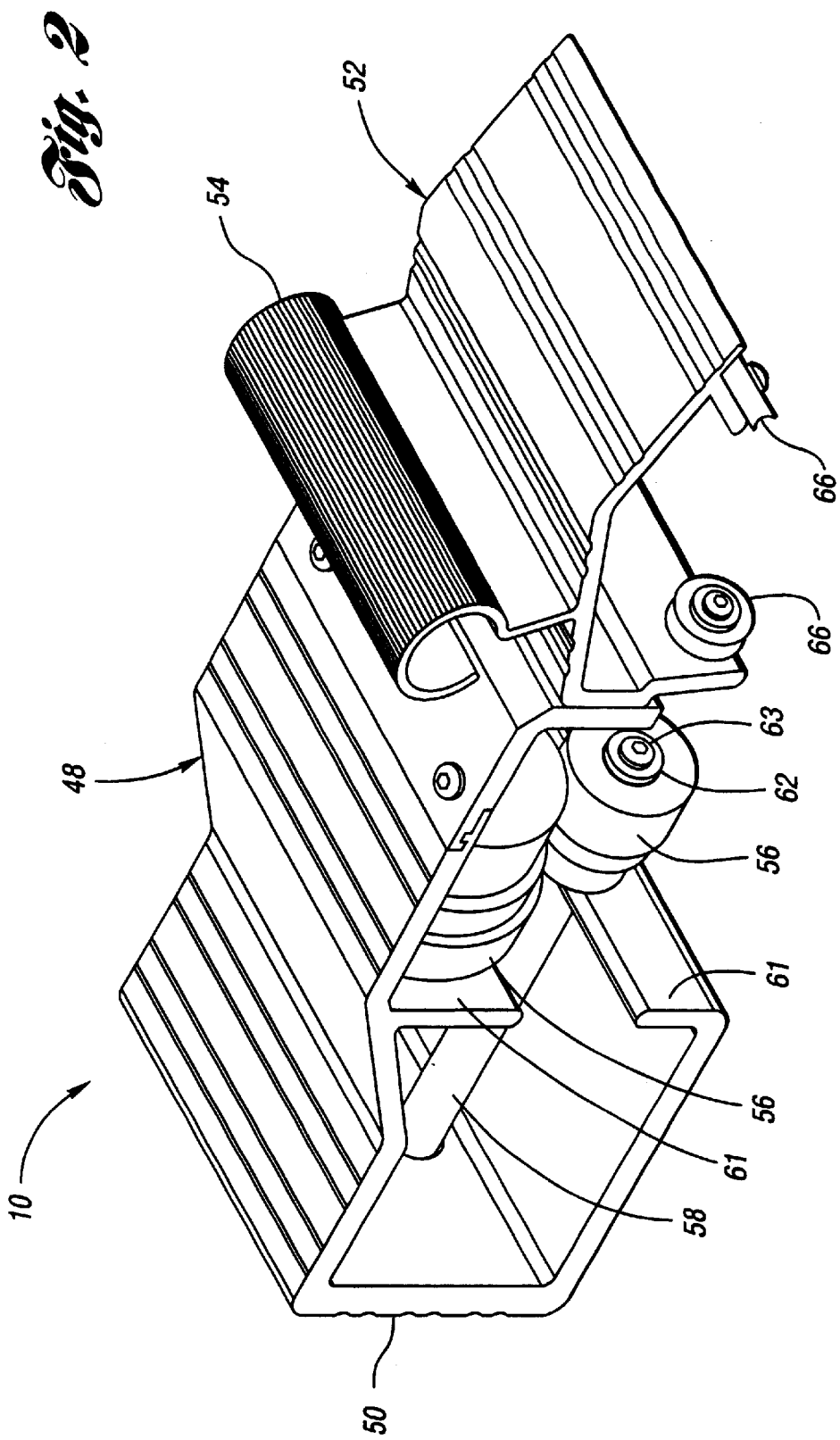
FIG. 2 is a perspective view of the forming tool of the present invention.

Referring now to FIGS. 2 and 3, forming tool 10 for creating a profile in workpiece 21 in accordance with the present invention is shown in greater detail. Forming tool 10 includes a body 48 having a generally C-shaped throat section 50 extending in a plane substantially perpendicular to a longitudinal axis of bending brake 12. A carriage 52 is attached to body 48, or alternatively is formed integrally therewith, and is operable to move longitudinally along bending brake 12. In a preferred embodiment, body 48 and carriage 52 are extruded from aluminum and forming tool 10 is lightweight and portable for convenient job site use. Carriage 52 is preferably formed with an inverted "U" shape as shown, serving to minimize the material necessary for its construction. However, carriage 52 may comprise any shape which is suitable for movement along bending brake 12. A handle 54 is preferably provided on carriage 52 as shown in order to aid in movement of forming tool 10 along bending brake 12. Alternatively, handle 54 could be provided on body 48.

Still referring to FIGS. 2 and 3, forming tool 10 of the present invention further includes a pair of opposed forming dies 56 rotatably and removably mounted on body 48. Forming dies 56 are operable to create a profile in workpiece 21 as workpiece 21 passes therebetween. In particular, forming dies 56 are removably mounted along axles 58 affixed to body 48. In order to properly position and align forming dies 56, axle spacers 60 are preferably slid onto each axle 58 in abutting relationship with lip portions 61 of throat section 50. Then, forming dies 56 are slid onto axles 58 until contact is made with axle spacers 60, after which forming dies 56 are secured on axles 58 by any suitable means, such as with a washer 62 and screw 63.

In a preferred embodiment, forming dies 56 are constructed from a plastic material. Use of a plastic material to construct forming dies 56 protects any painted surfaces of workpieces 21 from damage, and plastic forming dies 56 do not require lubrication for proper functioning.

As shown in FIGS. 1–3, throat section 50 of forming tool 10 is preferably sized with enough depth to easily accommodate wide workpieces 21 that are either flat or pre-bent. With this design, forming tool 10 is therefore not limited to creating profiles near the edge of workpiece 21.

With reference to FIGS. 1 and 3, bending brake 12 is provided with a guide 64 along which carriage 52 is moved. Guide 64 is either formed integrally on brake 12, as shown in FIG. 1, or is removably mounted thereon. Guide 64 is preferably provided on clamping member 38 as shown, but may alternatively be provided on another part of bending brake 12, such as bending leaf 44. Guide 64 is formed as a raised portion of clamping member 38, and carriage 52 supports at least one pair of longitudinally spaced rollers 66 having concave peripheries operable to engage guide 64. Of course, rollers 66 could alternatively be formed as convex wheels and guide 64 could be concave in shape. In the preferred embodiment depicted in FIGS. 1 and 3, guide 64 includes two separate raised portions, and carriage 52 has two sets of rollers 66 for movement along guide 64 for capturing and securing forming tool 10 to bending brake 12 with greater stability. Guide 64 allows forming tool 10 to create straight, accurate, and consistent profiles in workpiece 21. Such consistency and accuracy in seams and miters is especially important when joining multiple workpieces during trim installation on a house or building.

In a preferred embodiment of the present invention, carriage 52 is easily removable from bending brake 12 at any point along brake 12. Alternatively, carriage 52 could be fixed to brake 12 and stored by sliding carriage 52 to one end of brake 12 during normal bending operations. Preferably, carriage 52 is manually movable along bending brake 12 but, alternatively, movement of carriage 52 may be motorized.

In accordance with the present invention, forming dies 56 are interchangeable with other pairs of forming dies 56 such that forming tool 10 can be used to create a variety of different profiles in a workpiece 21. For example, forming dies 56 for creating a standard brick mold profile in a workpiece are shown in FIG. 4a, providing a proper fit as well as appealing detail. In addition, forming dies 56 for creating a rib profile, or narrow raised portion, in a workpiece are shown in FIG. 4b. Such a rib profile is useful in strengthening long workpieces typically used on fascia, thereby reducing any "oil canning," rippling, or waving in the workpiece. FIG. 4c shows forming dies 56 capable of making a 45° bend at an edge of a workpiece, a shape that can be used when making drip cap or roof flashings to keep water out. Referring to FIG. 4d, forming dies 56 are shown for creating a bead in a workpiece 21. A bead is commonly incorporated in corner posts, window trim, and fascia, and can serve a decorative function as well as increasing the strength of a workpiece 21. Lastly, since bending brakes are only capable of making straight bends, the forming dies 56 shown in FIG. 4e are capable of making a curved shape, or "tank roll," which could be used for various purposes, such as creating crown molding.

Therefore, forming tool 10 of the present invention is capable of quickly forming commonly needed trim shapes. Some of these shapes, such as curved profiles as well as bends at the edge of the workpiece, are not otherwise possible with a bending brake alone. Furthermore, forming tool 10 can be readily added to an existing bending brake. In addition to bending brake 12, it is fully contemplated that the forming tool 10 of the present invention can be utilized with other material-working apparatuses, such as a basic work table.

While embodiments of the invention have been illustrated and described, it is not intended that these embodiments illustrate and describe all possible forms of the invention. Rather, the words used are words of description rather than limitation, and it is understood that various changes may be made without departing from the spirit and scope of the invention.

What is claimed is:

1. A forming tool for creating a profile in a workpiece held within a bending brake, the forming tool comprising:
    a body;
    a carriage attached to the body and operable to move longitudinally along a guide provided on the bending brake; and
    a pair of opposed forming dies rotatably and removably mounted on the body, wherein the forming dies are configured to press the workpiece to create a profile in the workpiece as the workpiece passes between the forming dies, and the forming dies are interchangeable with another pair of forming dies for creating a different profile in the workpiece.

2. The forming tool of claim 1, wherein the body includes a generally C-shaped throat section.

3. The forming tool of claim 1, wherein the forming dies are constructed from a plastic material.

4. The forming tool of claim 1, further comprising a handle provided on one of the body and the carriage.

5. The forming tool of claim 1, wherein the forming tool is removable from the bending brake.

6. The forming tool of claim 1, wherein the forming tool is manually movable along the guide.

7. The forming tool of claim 1, wherein the carriage includes at least one pair of longitudinally spaced rollers operable to engage the guide.

8. The forming tool of claim 1, wherein the forming dies are operable to create a brick mold profile in the workpiece.

9. The forming tool of claim 1, wherein the forming dies are operable to create a rib profile in the workpiece.

10. The forming tool of claim 1, wherein the forming dies are operable to create a bead profile in the workpiece.

11. The forming tool of claim 1, wherein the forming dies are operable to create a curved profile in the workpiece.

12. The forming tool of claim 1, wherein the forming dies are operable to create a bend at an edge of the workpiece.

13. A forming tool for creating a profile in a workpiece held within a material-working apparatus, the forming tool comprising:
    a body;
    a carriage attached to the body and operable to move longitudinally along a guide provided on the material-working apparatus; and
    a pair of opposed forming dies rotatably and removably mounted on the body, wherein the forming dies are configured to press the workpiece to create a profile in the workpiece as the workpiece passes between the forming dies, and the forming dies are interchangeable with another pair of forming dies for creating a different profile in the workpiece.

14. A bending brake comprising:
    a base;
    at least two longitudinally spaced C-shaped support castings secured in assembly to the base, each support casting including a lower arm terminating in a horizontal support surface for supporting a workpiece and an upper arm spaced from and generally overlying the lower arm;
    a clamping arm for each casting, each clamping arm having a first end pivotally secured to the support casting and a second end projecting toward the horizontal support surface;
    a clamping member affixed to the second end of each clamping arm, the clamping member overlying the horizontal support surface and cooperable therewith for clamping a workpiece therebetween;
    a bending leaf hinged to the horizontal support surface for bending the workpiece;
    a guide extending longitudinally along one of the clamping member and the bending leaf; and
    a forming tool including a body, a carriage attached to the body and operable to engage the guide and move longitudinally along the bending brake, and a pair of opposed forming dies rotatably and removably mounted on the body, wherein the forming dies are operable to create a profile in the workpiece as the workpiece passes between the forming dies, and the forming dies are interchangeable with another pair of forming dies for creating a different profile in the workpiece.

15. The bending brake of claim 14, wherein the body includes a generally C-shaped throat section.

16. The bending brake of claim 14, wherein the forming dies are constructed from a plastic material.

17. The bending brake of claim 14, further comprising a handle provided on one of the body and the carriage.

18. The bending brake of claim 14, wherein the carriage is removable from the bending brake.

19. The bending brake of claim 14, wherein the forming tool is manually movable along the guide.

20. The bending brake of claim 14, wherein the carriage includes at least one pair of longitudinally spaced rollers operable to engage the guide.

21. The bending brake of claim 14, wherein the forming dies are operable to create a brick mold profile in the workpiece.

22. The bending brake of claim 14, wherein the forming dies are operable to create a rib profile in the workpiece.

23. The bending brake of claim 14, wherein the forming dies are operable to create a bead profile in the workpiece.

24. The bending brake of claim 14, wherein the forming dies are operable to create a curved profile in the workpiece.

25. The bending brake of claim 14, wherein the forming dies are operable to create a bend at an edge of the workpiece.

26. A bending brake comprising:
 a base;
 a horizontal support surface attached to the base for supporting a workpiece;
 a clamping member pivotally secured to the base, the clamping member overlying the horizontal support surface and cooperable therewith for clamping a workpiece therebetween;
 a bending leaf hinged to the horizontal support surface for bending the workpiece;
 a guide extending longitudinally along one of the clamping member and the bending leaf; and
 a forming tool including a body, a carriage attached to the body and operable to engage the guide and move longitudinally along the bending brake, and a pair of opposed forming dies rotatably and removably mounted on the body, wherein the forming dies are operable to create a profile in the workpiece as the workpiece passes between the forming dies, and the forming dies are interchangeable with another pair of forming dies for creating a different profile in the workpiece.

27. The bending brake of claim 26, wherein the body includes a generally C-shaped throat section.

28. The bending brake of claim 26, wherein the forming dies are constructed from a plastic material.

29. The bending brake of claim 26, further comprising a handle provided on one of the body and the carriage.

30. The bending brake of claim 26, wherein the carriage is removable from the bending brake.

31. The bending brake of claim 26, wherein the forming tool is manually movable along the guide.

32. The bending brake of claim 26, wherein the carriage includes at least one pair of longitudinally spaced rollers operable to engage the guide.

33. The bending brake of claim 26, wherein the forming dies are operable to create a brick mold profile in the workpiece.

34. The bending brake of claim 26, wherein the forming dies are operable to create a rib profile in the workpiece.

35. The bending brake of claim 26, wherein the forming dies are operable to create a bead profile in the workpiece.

36. The bending brake of claim 26, wherein the forming dies are operable to create a curved profile in the workpiece.

37. The bending brake of claim 26, wherein the forming dies are operable to create a bend at an edge of the workpiece.

38. A forming tool for creating a profile in a workpiece held within a bending brake, the forming tool comprising:
 a body including a generally C-shaped throat section sized to receive an edge of the workpiece;
 a carriage attached to the body and operable to move longitudinally along a guide provided on the bending brake; and
 a pair of opposed forming dies rotatably and removably mounted on the body, wherein the forming dies are operable to create a profile in the workpiece as the workpiece passes between the forming dies, the throat section allowing the profile to be created at a location of the workpiece removed from the edge.

* * * * *